(12) United States Patent
Hsu

(10) Patent No.: US 7,520,692 B2
(45) Date of Patent: Apr. 21, 2009

(54) DETACHABLE FASTENING APPARATUS FOR FRONT FORK ACCESSORIES OF BICYCLES

(75) Inventor: Kuo-Chung Hsu, Changhua (TW)

(73) Assignee: Sunny Wheel Industrial Co., Ltd., Changhua (TW)

( * ) Notice: Subject to any disclaimer, the term of this patent is extended or adjusted under 35 U.S.C. 154(b) by 402 days.

(21) Appl. No.: 11/304,739

(22) Filed: Dec. 16, 2005

(65) Prior Publication Data

US 2007/0183862 A1    Aug. 9, 2007

(51) Int. Cl.
*F16B 21/02*    (2006.01)

(52) U.S. Cl. .................. 403/349; 403/297; 403/314; 403/374.3; 403/DIG. 4

(58) Field of Classification Search ............... 403/297, 403/303, 314, 322.4, 348–350, 359.3, 374.3, 403/DIG. 4; 280/152.1
See application file for complete search history.

(56) References Cited

U.S. PATENT DOCUMENTS 5,419,650 A * 5/1995 Hoshino .................. 403/370

\* cited by examiner

*Primary Examiner*—Victor Macarthur
(74) *Attorney, Agent, or Firm*—Troxell Law Office PLLC

(57) ABSTRACT

A detachable fastening apparatus for front fork accessories of bicycles to provide fast installation and removing of the bicycle accessories on the front fork of the bicycles. It includes a packing means and a coupling dock located on an accessory. The packing means has a rotary latch disk and can be anchored in a tube of the front fork. By swiveling the rotary latch disk the packing means can be fastened to the coupling dock thereby to install or remove the accessory rapidly.

11 Claims, 7 Drawing Sheets

DETACHABLE FASTENING APPARATUS FOR FRONT FORK ACCESSORIES OF BICYCLES

BACKGROUND OF THE INVENTION

1. Field of the Invention

The invention relates to a detachable fastening apparatus for front fork accessories of bicycles and particularly to a fastening apparatus to form a fast fastening or unfastening between a bicycle accessory and a front fork to facilitate fast installation or removing of the accessory.

2. Description of the Prior Art

Users of modern bicycles often install desired accessories such as a fender, knapsack bracket or the like according to their requirements. Installation and removing of the accessories encounter some problems, notably: 1. inconvenience in the installation and removing, and 2. lack a common coupling structure for fastening the accessories to the bicycle frame, especially on the front fork. For instance, EP1029777, EP1188652 and EP1435323 (called prior art hereinafter) disclose techniques that have a thrust element to be coupled with a bicycle accessory (fender) through a flute or track to achieve fast installation or removing. The prior art is applicable only for installation of some specific accessories such as the fender. Moreover, their structure cannot withstand the accessories of a heavier loading such as knapsack brackets. In addition, coupling through the flute or track in a parallel manner often incurs a greater gap between the flute (or track) and the coupling element after the bicycle has been used in rough and bumping conditions for a period of time. As a result, the fender sways and generates noise. It becomes an annoyance to the users.

SUMMARY OF THE INVENTION

In view of the aforesaid problems, the present invention aims to provide a detachable fastening apparatus for front fork accessories of bicycles to facilitate fast fastening or removing of a bicycle accessory. It includes at least a packing means and a coupling dock located on the accessory. The packing means has a rotary latch disk. The packing means is located and anchored in a front fork tube. The rotary latch disk can be swiveled to latch on the coupling dock to achieve fast installation and removing of the accessory.

The packing means includes a thrust member, a contracting sleeve, a base, the rotary latch disk, an elastic element and an anchor seat. The thrust member is fastened by a bolt to ram the contracting sleeve outwards to anchor the packing means in the front fork tube of the bicycle.

The rotary latch disk has a handle, an opening in the center and two opposing arched slots on the top surface to be wedged in by two detente struts on the bottom of the base to limit swiveling of the rotary latch disk.

The rotary latch disk further has one or more latch element which has a trough on one side to form a latch edge.

The coupling dock has a circular recess in the center and one or more holding trough on the peripheral side of the circular recess, and a latch hole on one side of the holding trough.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 2A is another perspective view of the base.
FIG. 2B is another perspective view of the rotary latch disk.

DESCRIPTION OF THE PREFERRED EMBODIMENTS

Figure 1:
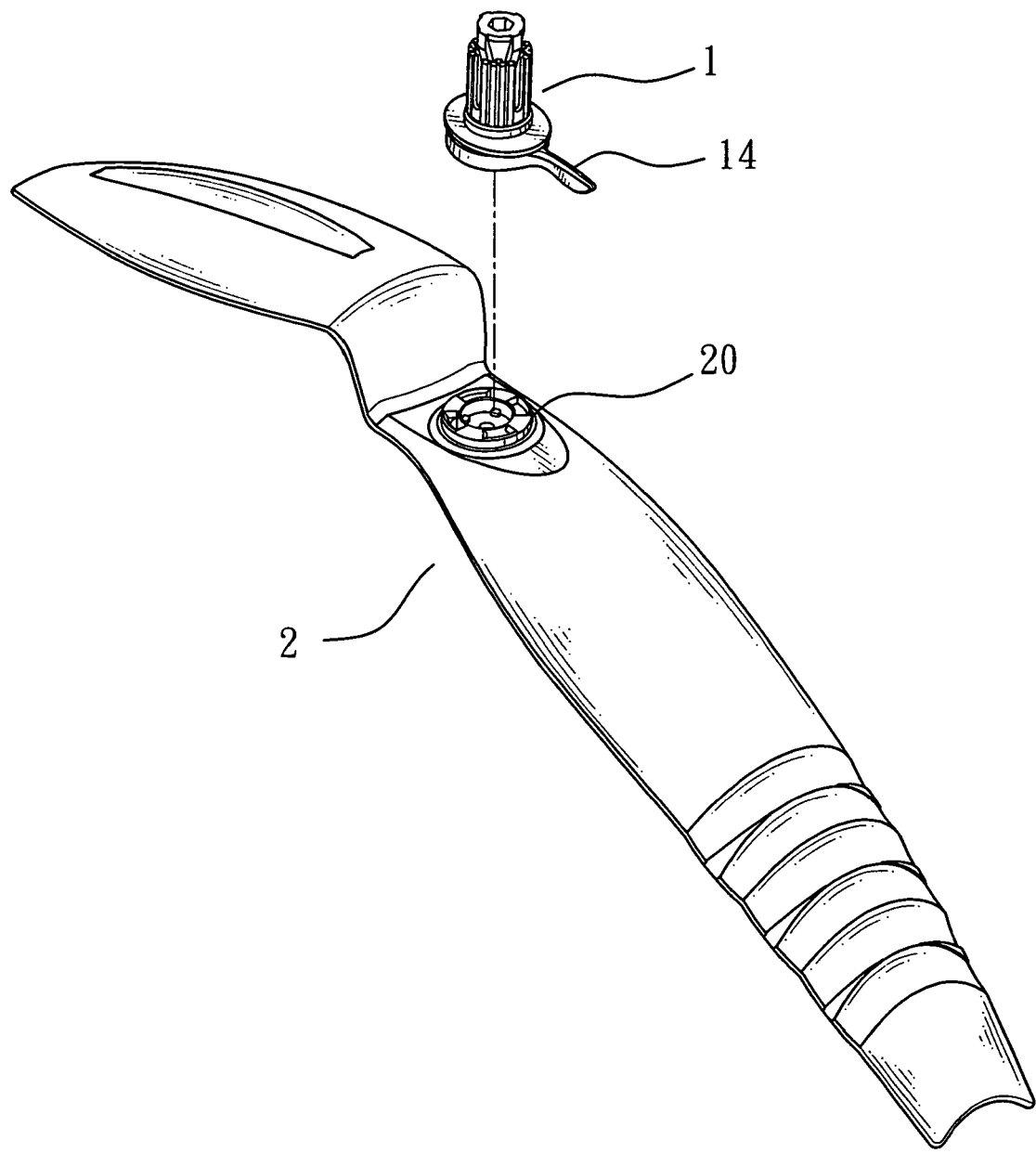
FIG. 1 is an exploded view of the invention.

Referring to FIG. 1, the detachable fastening apparatus for front fork accessories according to the invention includes a packing means 1 and a coupling dock 20 located on an accessory 2. The packing means 1 has a rotary latch disk 14 to be fastened to the coupling dock by swiveling and a upper end to be anchored in a tube 30 of a front fork 3 by thrusting (also referring to FIGS. 3 and 4).

Figure 2:
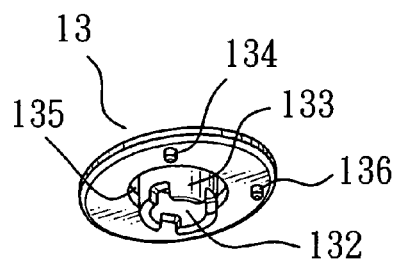
FIG. 2 is another exploded view of the invention.
Figure 2:
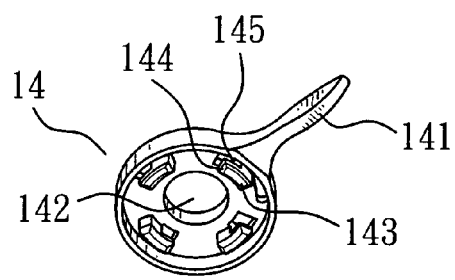
Figure 2:
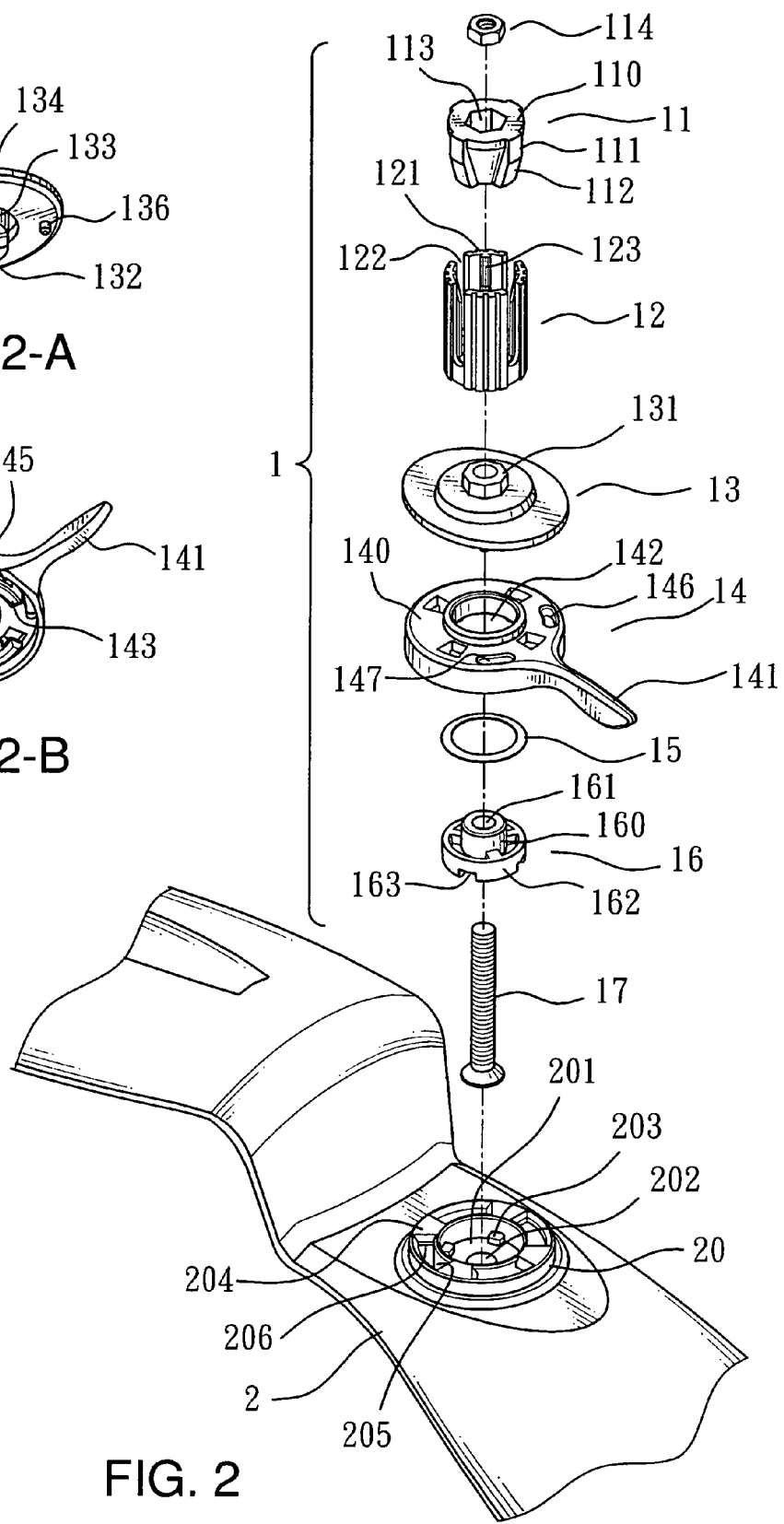

Referring to FIG. 2, the packing means 1 includes a thrust member 11, a contracting sleeve 12, a base 13, the rotary latch disk 14, an elastic element 15 and an anchor seat 16.

The thrust member 11 has a conical body 111 with one or more ribs 111 on the periphery, a through hole 113 in the center and a nut 114 held on a upper end. Each rib 111 has a sloped surface 112 on a lower portion.

The contracting sleeve 12 has one or more slots 122 on the periphery and a polygonal hole 124 on the bottom. Every two neighboring slots 122 are interposed by an elastic reed 121 which has a longitudinal flute 123 in the center of an inner side.

The base 13 has a polygonal strut 131 on the top, a circular hub 133 extended from the bottom (referring to FIG. 2A) with a center hole 132, a circular trough 135 and two detente struts 134 and 136 outside the circular hub 133.

The rotary latch disk 14 has a handle 141, an opening 142 in the center, a top surface 140 with two opposing arched slots 146 and 147 formed thereon, and one or more latch elements 143 on the bottom around the opening 142. Each latch element 143 has a trough 145 on one side to form a latch edge 144 (referring to FIG. 2B).

The anchor seat 16 has a circular shaft 160 on a upper portion to run through the elastic element 15, a circular tray 162 on a lower portion and a through hole 161 in the center to allow a bolt 17 to run through from the bottom to be coupled with the nut 114. The circular tray 162 has one or more anchor notches 163 formed on the periphery of the bottom thereof.

The coupling dock 20 is located on the accessory 2, and has a circular recess 201 with a hole 202 and one or more retaining lugs 203. The circular recess 201 is surrounded by a peripheral top surface 204 which has one or more holding troughs 205 formed thereon. Each holding trough 205 has a latch hole 206 on one side.

Figure 3:
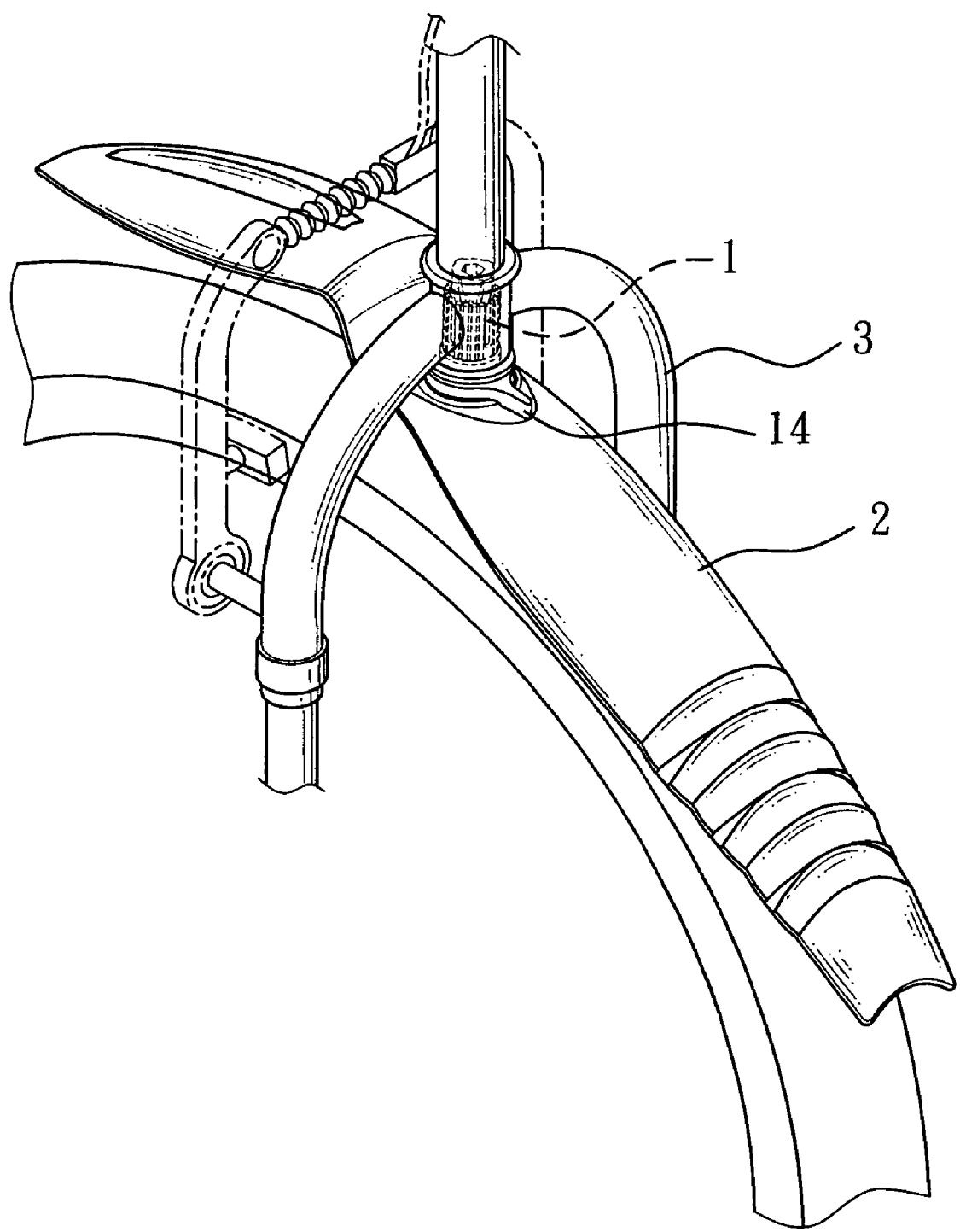
FIG. 3 is a perspective view of the invention.
Figure 4:
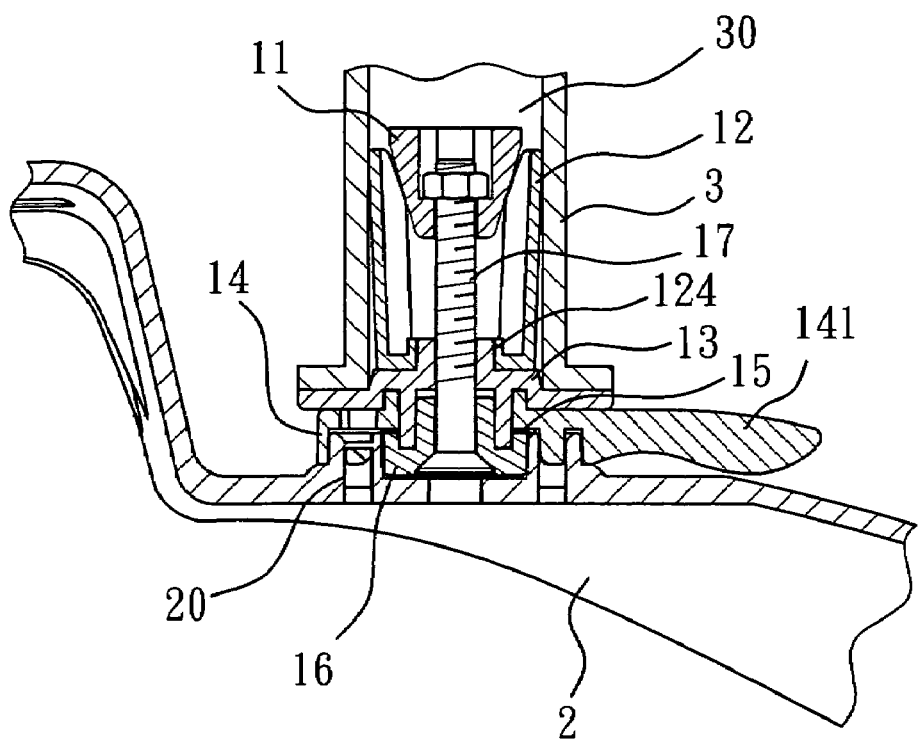
FIG. 4 is a sectional view of the invention.
Figure 5:
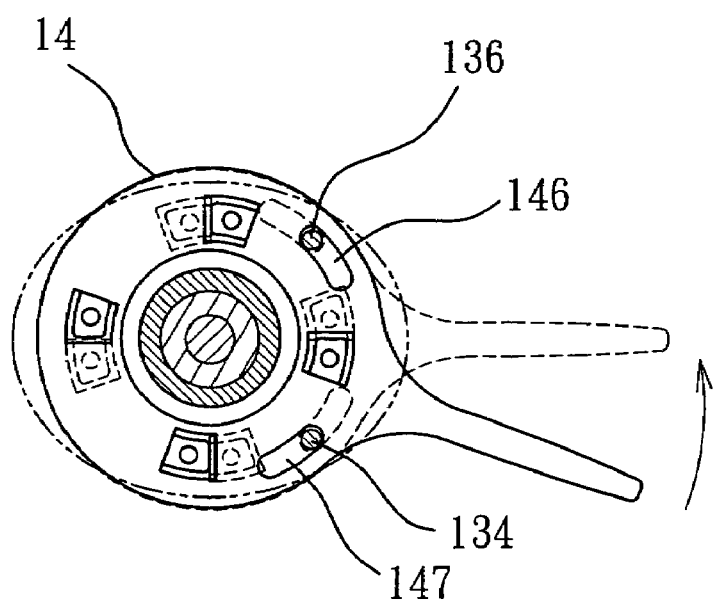
FIG. 5 is a schematic view of the invention in an operating condition.
Figure 6:
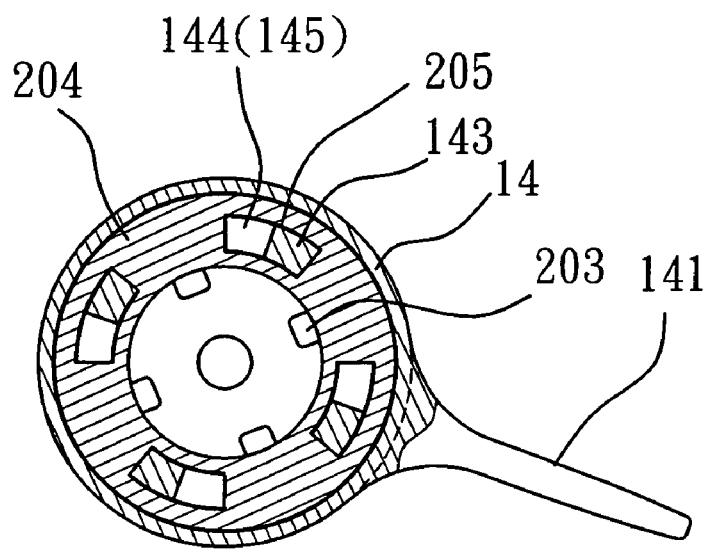
FIG. 6 is a schematic view of the invention in another operating condition.
Figure 7:
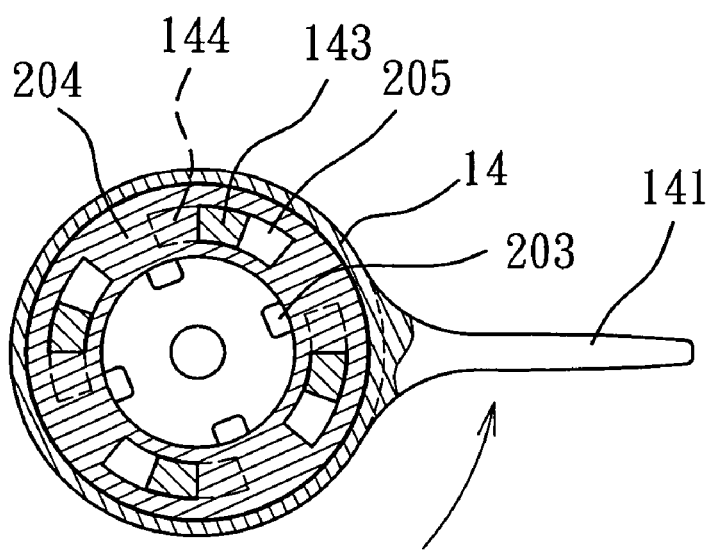
FIG. 7 is a schematic view of the invention in yet another operating condition.

By means of the structure set forth above, when to install the accessory 2 (such as a fender), referring to FIGS. 3 and 4, first, the bolt 17 is run through the through hole 161 of the anchor seat 16, the elastic element 15, the opening 142 of the rotary latch disk 14, the base 13, and the contracting sleeve 12 to be coupled with the nut 114 of the thrust member 11 to form the assembly of the packing means 1; next, place the upper portion of the packing means in the tube 30 of the front fork 3, and fasten the bolt 17 to pull the thrust member 11 downwards to thrust the contracting sleeve 12 to expand outwards until it is tightly held in the tube 30; then align the coupling dock 20 of the accessory 2 with the lower end of the packing means 1 and place the circular tray 162 of the anchor seat 16 in the circular recess 201 of the coupling dock 20 with the anchor notches 163 wedging by the retaining lugs 203 to form an anchoring condition; meanwhile, the latch elements 143 of the rotary latch disk 14 also are wedged in the holding troughs 205 of the coupling dock 20 (as shown in FIG. 6); push and turn the handle 141 with a finger to swivel the rotary latch disk 14, the two arched slots 146 and 147 are turned and stopped by the two detent struts 134 and 136 of the base 13 (as shown in FIG. 5), hence the rotary latch disk 14 can be swiveled to correctly position the latch edge 144 in the latch hole 206 of the coupling dock 20 to form a coupling condition (as shown in FIG. 7). On the other hand, to remove the accessory 2, swivel the rotary latch disk 10 in the opposite direction, the packing means 1 can be disengaged with the coupling dock 20 and be removed.

Figure 8:
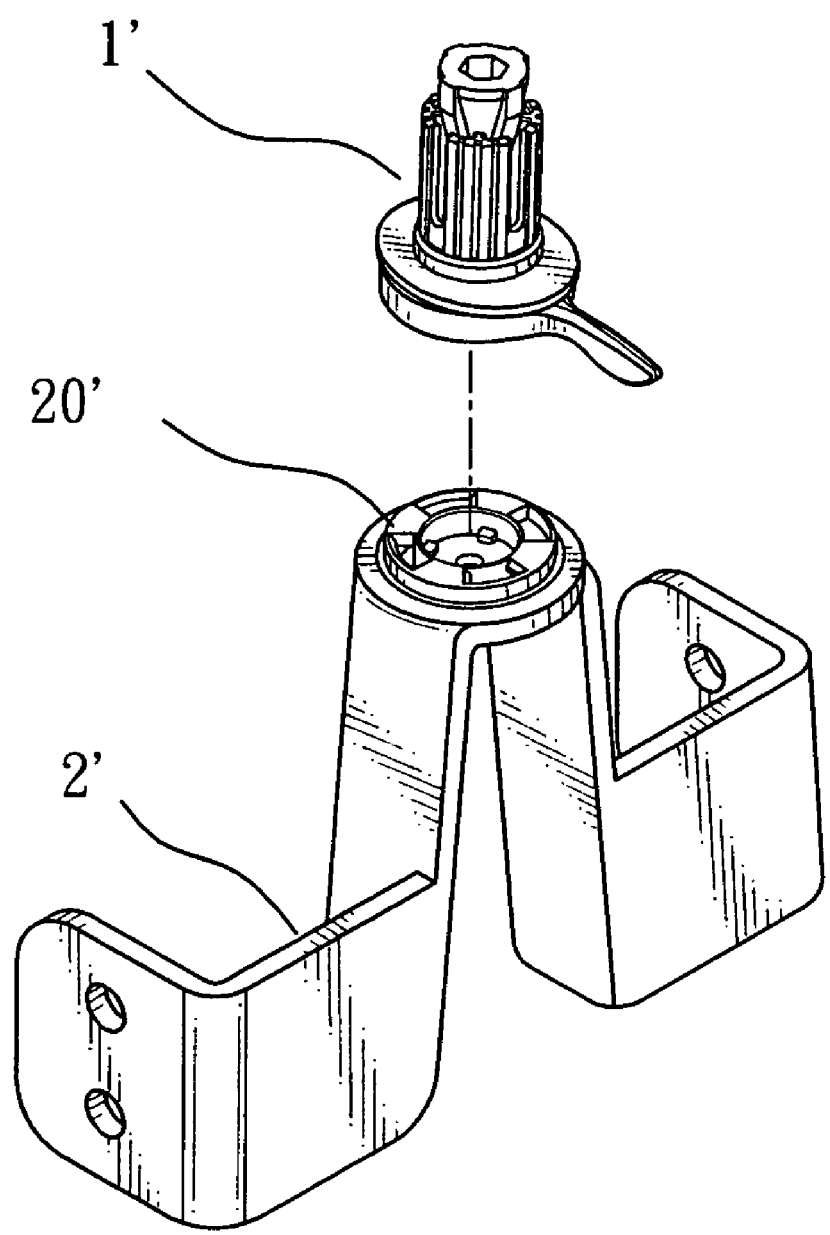
FIG. 8 is a schematic view of another embodiment of the invention.
Figure 9:
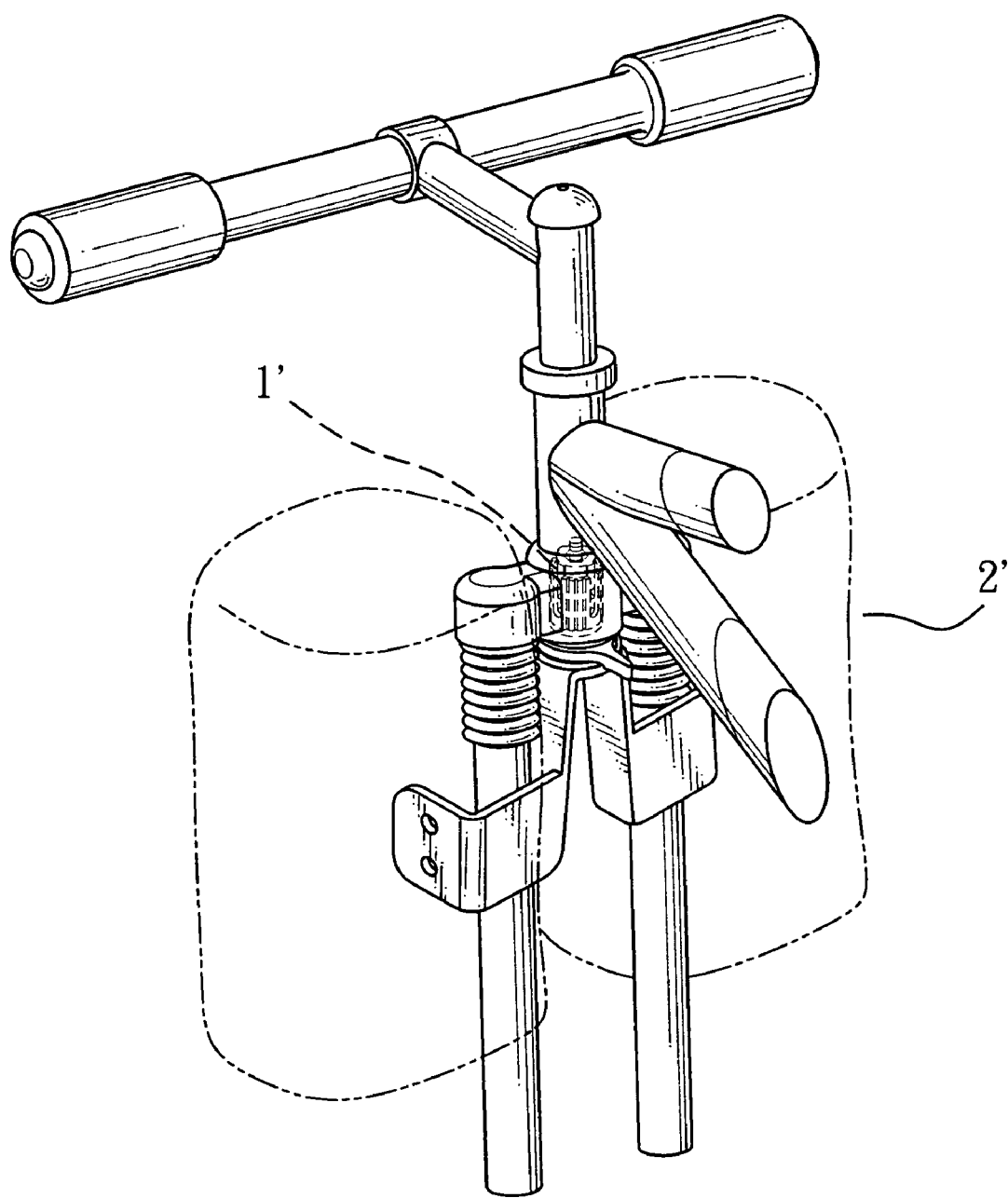
FIG. 9 is a schematic view of another embodiment of the invention in a use condition.

Refer to FIGS. 8 and 9 for another embodiment of the invention for holding a knapsack bracket 2'. First, the packing means 1' is installed in the tube of the front fork as the previous embodiment does. The knapsack bracket 2' is fastened to a coupling dock 20' to be coupled with the packing means 1'. Installation and removing operations are same as the previous embodiment.

In summary, the invention can provide fast assembly and installation and removing of the bicycle accessories (such as fenders, knapsack brackets and the like) with the front fork of the bicycle. It offers a significant improvement over the conventional techniques.

I claim:

1. A detachable fastening apparatus for fastening an accessory to a front fork of a bicycle, the apparatus comprising:
   a) a packing device having:
      i) a thrust member having ribs;
      ii) a contracting sleeve having slots that receive the ribs;
      iii) a base;
      iv) a rotary latch disk having a handle and a plurality of hook shaped latch elements;
      v) an elastic element;
      vi) an anchor seat having notches; and
      vii) a bolt extending through the thrust member, contracting sleeve, base, rotary latch disk, elastic element and anchor seat, the bolt having a nut threadably tightened thereon to clamp the packing device and force the thrust member into the contracting sleeve to expand the contracting sleeve outward to fixedly wedge within the front fork;
   b) a coupling dock for supporting the accessory when located thereon, the coupling dock having a circular recess to receive the anchor seat, and further having retaining lugs to receive the notches, and further having holding troughs for receiving the latch elements;
      the rotary latch disk being rotatable between fastened and unfastened positions relative to the coupling dock to form a bayonet connection,
   wherein, when the rotary latch disk is rotated to the fastened position, the rotary latch disk and the coupling dock are connected together,
   wherein, when the rotary latch disk is rotated to the unfastened position, the rotary latch disk and the coupling dock capable of being separated.

2. The detachable fastening apparatus according to claim 1, wherein the base is located between the rotary latch disk and the contracting sleeve.

3. The detachable fastening apparatus according to claim 1, wherein the elastic element is located below the rotary latch disk.

4. The detachable fastening apparatus according to claim 1, wherein the anchor seat is located below the rotary latch disk.

5. The detachable fastening apparatus according to claim 4, wherein the anchor seat has a circular tray located on a lower portion.

6. The detachable fastening apparatus according to claim 1, wherein the base has two detent struts located on a bottom thereof.

7. The detachable fastening apparatus according to claim 1, wherein the rotary latch disk has an opening located in a center thereof.

8. The detachable fastening apparatus according to claim 7, wherein each latch element has a trough located on one side forming a latch edge.

9. The detachable fastening apparatus according to claim 1, wherein the rotary latch disk has a top surface having two opposing arched slots formed thereon.

10. The detachable fastening apparatus according to claim 1, wherein each holding trough has a latch hole located on one side.

11. The detachable fastening apparatus according to claim 1, wherein the circular recess has a centrally located hole.

\* \* \* \* \*